(12) United States Patent
Wenzel

(10) Patent No.: US 7,757,021 B2
(45) Date of Patent: Jul. 13, 2010

(54) SLAVE BUS SUBSCRIBER FOR A SERIAL DATA BUS

(75) Inventor: Dirk Wenzel, Hamburg (DE)

(73) Assignee: NXP B.V., Eindhoven (NL)

( * ) Notice: Subject to any disclaimer, the term of this patent is extended or adjusted under 35 U.S.C. 154(b) by 234 days.

(21) Appl. No.: 11/577,704

(22) PCT Filed: Oct. 7, 2005

(86) PCT No.: PCT/IB2005/053300
§ 371 (c)(1),
(2), (4) Date: Apr. 16, 2008

(87) PCT Pub. No.: WO2006/043186
PCT Pub. Date: Apr. 27, 2006

(65) Prior Publication Data
US 2008/0276023 A1 Nov. 6, 2008

(30) Foreign Application Priority Data
Oct. 21, 2004 (EP) .................. 04105213

(51) Int. Cl.
G06F 3/00 (2006.01)
G06F 1/00 (2006.01)
(52) U.S. Cl. .................. 710/60; 710/61; 710/110; 713/500
(58) Field of Classification Search ........... 710/29, 710/30, 60, 61, 110; 713/400, 500, 501, 713/503, 600
See application file for complete search history.

(56) References Cited

U.S. PATENT DOCUMENTS

| | | | |
|---|---|---|---|
| 5,612,961 A * | 3/1997 | Cabezas et al. ............. 714/715 |
| 7,418,031 B2 * | 8/2008 | Jha et al. ..................... 375/225 |
| 2002/0101884 A1 * | 8/2002 | Pohlmeyer et al. .......... 370/509 |
| 2003/0070019 A1 * | 4/2003 | Dalakuras et al. ........... 710/110 |
| 2006/0013348 A1 * | 1/2006 | Klosters et al. ............. 375/368 |
| 2006/0120390 A1 * | 6/2006 | Habben et al. .............. 370/406 |
| 2006/0245515 A1 * | 11/2006 | Tachi ......................... 375/293 |
| 2007/0291887 A1 * | 12/2007 | Ishimoto ..................... 375/371 |

OTHER PUBLICATIONS

Introduction to LIN bus, Kvaser AB, < http://www.kvaser.com/index.htm>, accessed on Jun. 16, 2009.*

* cited by examiner

*Primary Examiner*—Khanh Dang

(57) ABSTRACT

The invention relates to a slave bus subscriber for a serial data bus with a master bus subscriber, wherein the slave subscriber recognizes the bit rate of a data packet received over the data bus, whose header has a sync break field, a sync field and an ID field, with the help of the header of the data packet in such a manner that the periods between falling edges of bits having known bit intervals at least of the sync field and of the sync break field are evaluated and the bit rate is determined from the evaluated periods.

12 Claims, 2 Drawing Sheets

SLAVE BUS SUBSCRIBER FOR A SERIAL DATA BUS

Figure 1:
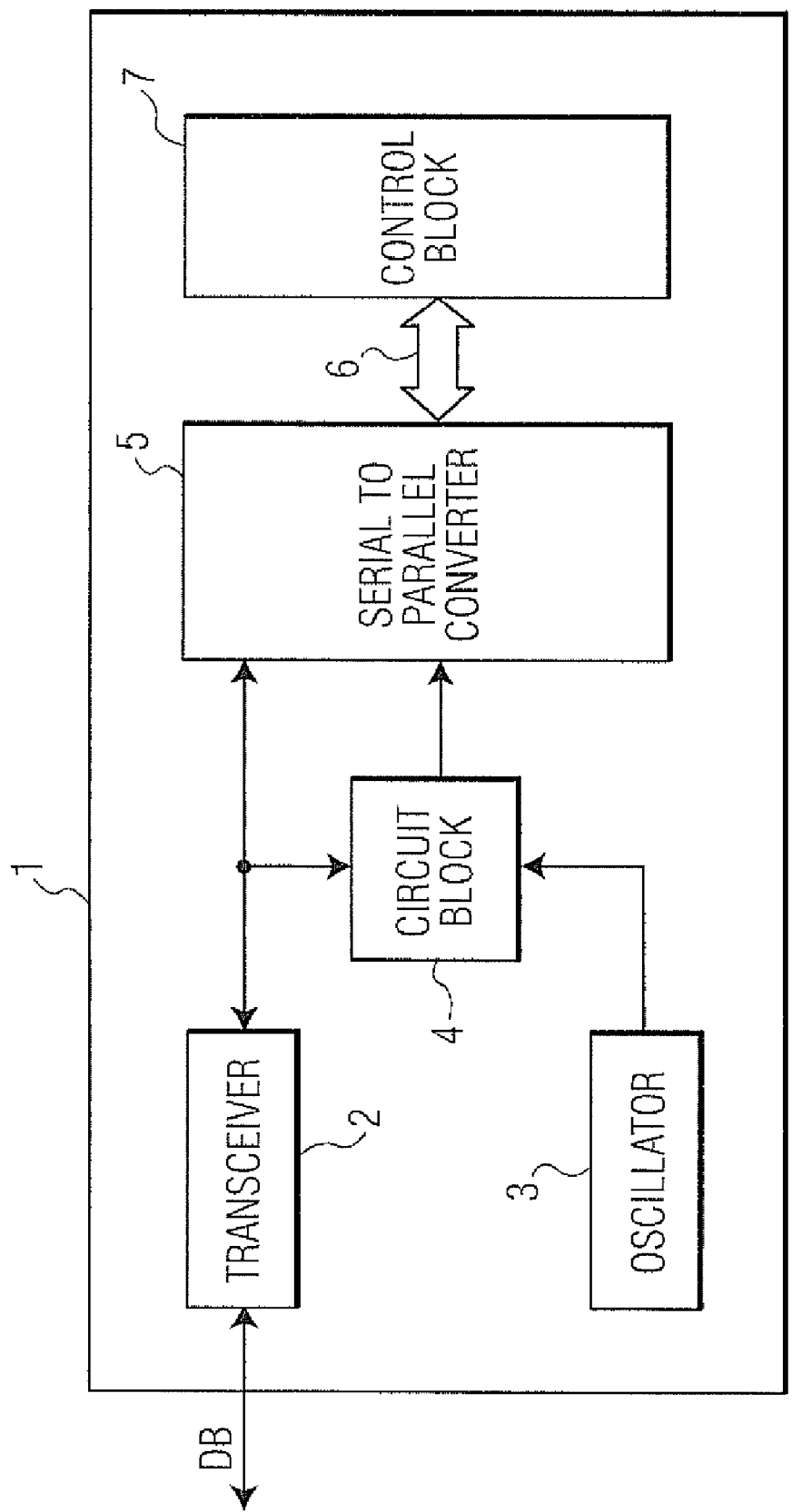

The invention relates to a slave bus subscriber for a serial data bus to which additionally at least one master bus subscriber as well as possibly further slave bus subscribers are connected.

Such serial data bus systems are put to multiple use in vehicles for transmitting control signals and data to peripheral units. Such a known serial data bus system is, for example, the LIN data bus that is used for purposes for which no extremely strict requirement as regards transmission speed or reliability is made.

In such a serial data bus system, mostly one master bus subscriber and possibly several slave bus subscribers are provided. Particularly the slave bus subscribers are to be realized in a cost-effective manner, so that they do not generally have any quartz. However, to still enable serial communication at the required bit rate or Baud rate with such a slave bus subscriber, a header having a sync field, i.e. a field with, for example, 10 bits (including start and stop bits) and having known bit values is generally provided in the data bus protocols of such serial data buses, so that a bit rate or Baud rate can be determined from the time sequence of the edges of the individual bits. But since such sync fields are generally relatively short, frequently having 10 bits in particular (including start and stop bits), the determination of the bit rate is not very accurate. Furthermore, in many applications interference is superimposed on the serially transmitted signals and thus also on the sync field. In addition, the signals have jitter i.e. time based errors, so that the predefined signal sequence allows only an imprecise determination of the bit rate on account of its limited length.

All said problems may cause a quite inaccurate determination of the bit rate in practice.

It is an object of the present invention to indicate a slave bus subscriber which affords a more exact determination of the bit or Baud rate, as the case may be.

This object is achieved for a first embodiment of the invention by the features of the patent claim 1:

A slave bus subscriber for a serial data bus with a master bus subscriber, wherein the slave bus subscriber recognizes with the help of the header of the data packet the bit rate of a data packet whose header has a sync break field, a sync field and an ID field and is received over the data bus, so that the periods between edges of bits having known bit intervals of at least the sync field and the sync break field are evaluated and the bit rate is determined from the evaluated periods.

For recognizing the bit rate, the slave bus subscriber according to the invention evaluates not only the bits of the sync field actually provided for it, but also known bits of an additionally transmitted sync break field as well as preferably also the known bits of an ID field further transmitted in the header.

A requirement for the evaluation of these further fields is that they contain bits having known position and known values, whose positions and thus mutual intervals of the bits must be known. Thus with the known positions and known bit values the time sequence of the edges of these known bits can also be evaluated. This takes place, in principle, in the same manner as the evaluation of the bits of the sync field. Distinctly greater accuracy can be achieved, however, by using other bits of other fields, for example, the accuracy of the bit rate detection is tripled by using a total of 24 bits of the first two fields instead of the 8 bits customarily used. The bit rate can be determined in a manner known per se from the established intervals of the evaluated edges of the known bits of these two fields up to the beginning of the third field (Note: the falling edge of the start bit of the third field is needed!).

Furthermore, a clearly reduced susceptibility to interference and jitter is achieved by the broader base i.e. the higher number of bits on which the bit rate recognition is based.

Furthermore, there is the advantage that a slave bus subscriber working in accordance with the invention can be used in a data bus in common with slave bus subscribers that do not evaluate several fields for the bit rate recognition, but that use only 1 field for the bit rate recognition, as provided in the state of the art.

Advantageously, the start and stop bits of the fields can be used for determining the intervals of certain bits, as is provided according to one embodiment of the invention as claimed in claim 2, because these start and stop bits have known positions and values.

The evaluation of known bits i.e. bits of known values and known positions within the three fields assumes that also the stop bit of the sync break field has a specified time length, preferably the period predefined for 1 bit or a predefined number of stop bits. This is often the case in known systems. However, there may also be master bus subscribers in systems, which master bus subscribers do not adhere to these rules and select the periods or number of stop bits of the sync break field differently or variably. Therefore, it is proposed according to another embodiment of the invention as claimed in claim 3 that this time length is signaled to the slave or programmed in the slave if the time length of the stop bit of the sync break field is known.

Another embodiment of the invention as claimed in claim 4 describes special bits, which are generally fixedly predefined in the above-described fields of the header and whose values are known, which can thus be used advantageously for the bit rate recognition as invented.

Another embodiment of the invention as claimed in claim 5 provides that several bits of the ID field, where known, are incorporated in the bit rate recognition. If the ID code of the master bus subscriber is known, which is generally the case, a further improvement in the accuracy and security of bit rate recognition is provided.

As already mentioned in the opening paragraph, the slave bus subscriber as invented can be advantageously used in a LIN data bus, which has the above-mentioned three fields of the header according to its standardization, wherein certain bits are defined, on which the bit rate recognition can be based even for unknown contents, especially of the ID field.

These and other aspects of the invention are apparent from and will be elucidated, by way of non-limitative example, with reference to the embodiments described hereinafter.

Figure 2:
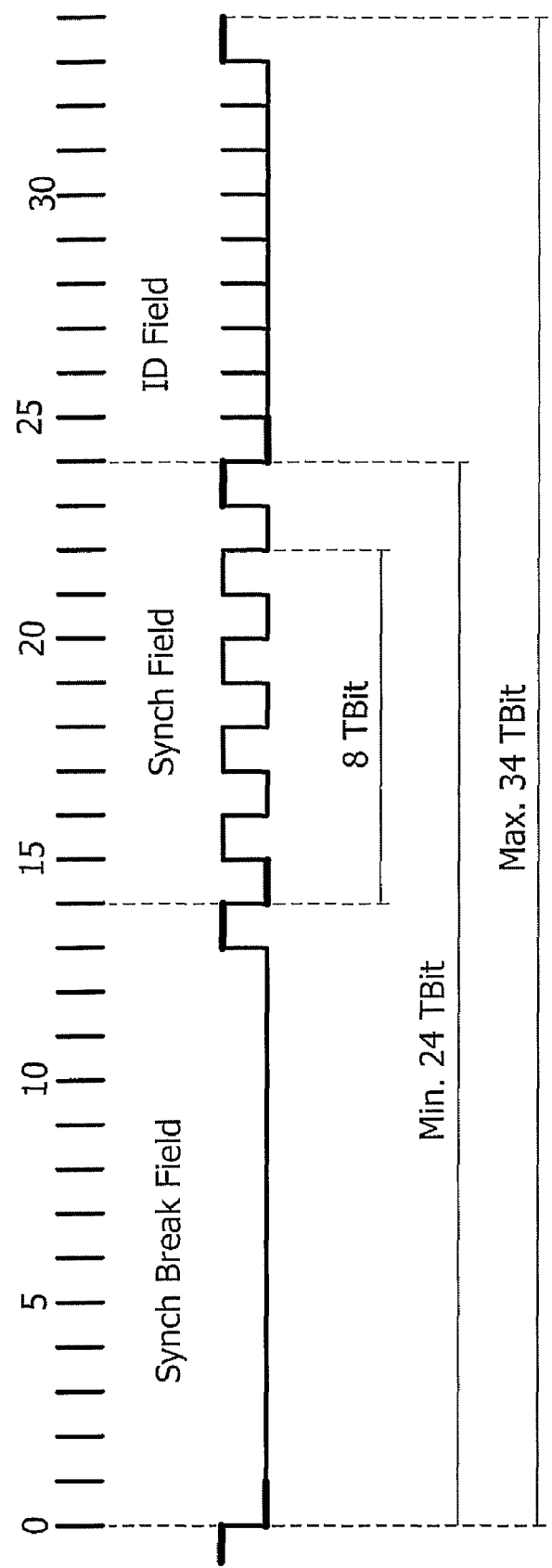

In the drawings,

FIG. 1: shows a block circuit diagram of the slave bus subscriber as invented and FIG. 2: shows a time diagram of a header of a data packet.

FIG. 1 shows a slave bus subscriber 1 as invented in the form of a block circuit diagram, which slave bus subscriber is connected to other bus subscribers over a serial data bus DB. These bus subscribers, which are not pointed out in any further detail in FIG. 1, are particularly master bus subscribers and possibly other slave bus subscribers.

The slave bus subscriber shown in FIG. 1 has a transceiver 2 that establishes the physical connection to the data bus DB, which is a serial data bus.

The data bus may be, for example, a what is called LIN data bus, which is often used in vehicles for transmitting control data not relevant to safety.

An oscillator 3 is provided in the slave bus subscriber 1, which oscillator has a low frequency accuracy, thus need not be a quartz oscillator. The construction of the oscillator provides that the structure of the slave bus subscriber can be comparatively cost-effective.

FIG. 1 further shows in the slave bus subscriber 1 a circuit block 4 for bit rate or Baud rate recognition. The circuit block 4 for the bit and Baud rate recognition receives for this purpose, on the one hand, the oscillator signal of the oscillator 3 and, on the other hand, the data that were received serially over the data bus DB and passed on to the circuit block 4 by means of the transceiver 2 for bit rate recognition.

These data further reach a serial-to-parallel converter 5, which converts the serially received data into parallel data. These parallel data are passed on to a control 7 over a parallel data bus 6 provided in the slave bus subscriber 1, which control 7 carries out an evaluation of the data, which, however, in a way not further shown in more detail in FIG. 1, also controls the other circuit blocks of the slave bus subscriber 1.

In order to execute the oscillator 3 shown in FIG. 1 as simple as possible, thus for example without the need to provide any quartz oscillator and also to execute the bit rate recognition by means of the circuit block 4 as accurately and securely as possible, a special evaluation of several fields of the header that precedes every data block is executed as invented. This is further explained as follows with reference to FIG. 2, which gives a schematic representation of the structure of such a header with three data packets.

As FIG. 2 shows, the whole header as shown in FIG. 2 has a maximum of 34 bits. The header is subdivided into three fields, namely a sync break field, a sync field and an ID field. Here the sync break field, the sync field and the ID field have one start bit each; the sync field and the ID field have one stop bit each and the sync break field has at least one stop bit.

With the solutions known according to the state of the art, only the sync field is used for bit rate recognition in slave bus subscribers. Its first 8 bits represent bits having known positions and known values, so that the time intervals to the bit edges of these bits can be evaluated and used for bit rate recognition. The main disadvantage of this is that only 8 bits are used for bit rate recognition and thus the accuracy of the bit rate recognition is relatively low. Furthermore, the low number of evaluated bits causes relatively high sensitivity to interference and jitter and to superpositioning of this data bus interference.

The bit rate recognition 4 in the slave bus subscriber as invented is therefore designed, as shown in FIG. 1, so that that also the bits having known positions and known values of the other fields, viz. of the sync break field and ID field are evaluated.

The representation in FIG. 2 shows where consecutive bits have respectively changing bit values. The sync break field has 14 bits, which are set to 0 in this example, with the exception of the stop bit. The ID field has 10 bits, whose contents may perhaps not be known, with the exception of the start and stop bits.

The first two fields each have a start and stop bit at the beginning and at the end respectively, the start bit at the beginning of the field having the 0 value and the stop bit at the end of the field having the 1 value. This similarly holds for the ID field. The sync break field may also have more than one stop bit, which can be communicated to the slave 1 possibly by using a corresponding signal or through programming.

Thus, these bit positions or edges of these bits as well as the useful bits of these fields can be used for the bit rate recognition. In the simplest case, up to 24 bits of the sync break field and of the sync field can be used for the bit rate recognition. Also 7 useful bits of the ID field as well as its start bit may be used for bit rate recognition, so that the bit rate recognition can reckon with a transmission time of 24 bits or 34 bits and thus the operation can be clearly more accurate than if it were based only on a transmission time of 8 bits, which is the case for solutions in accordance with the state of the art.

The slave bus subscriber as invented has been described in the example of embodiment with reference to a bus subscriber for the LIN data bus; the invention, however, is not restricted to a slave bus subscriber for this type of data bus, but can rather be used in many cases for serial data buses having a header of a known structure.

The invention claimed is:

1. A slave bus subscriber for a serial data bus with a master bus subscriber, wherein the slave bus subscriber recognizes with the help of the header of the data packet the bit rate of a data packet whose header has a sync break field, a sync field and an ID field and is received over the data bus, so that the periods between edges of bits having known bit intervals of at least the sync field and the sync break field are evaluated and the bit rate is determined from the evaluated periods, wherein the slave bus subscriber evaluates at least periods between falling edges of a first bit of the sync break field, of a plurality of bits of the sync field and at least a first bit of the ID field.

2. The slave bus subscriber of claim 1, wherein the sync break field, the sync field and the ID field have one start bit each, the sync field and the ID field have one stop bit each, and the sync break field has at least one stop bit.

3. The slave bus subscriber of claim 2, wherein as long as a number of stop bits of the sync break field is not a priori known to the slave bus subscriber, the number of stop bits can be indicated to the slave bus subscriber or programmed in it.

4. The slave bus subscriber of claim 2, wherein a number of the stop bits of the sync break field greater than one bit is taken into account when the periods are determined.

5. The slave bus subscriber of claim 1, wherein the slave bus subscriber also evaluates the period positions of the falling edges of known bits of the ID field.

6. The slave bus subscriber of claim 1, wherein the serial data bus is a LIN data bus.

7. A slave bus subscriber for a serial data bus with a master bus subscriber, comprising:
a transceiver that receives a data packet having a header, a sync break field, a sync field, and an ID field; and
a bit rate identifier that identifies a bit rate of the data packet based on the sync break field, the sync field and the ID field including evaluation of periods between edges of bits of the header having known bit intervals of at least the sync field and the sync break field and determining the bit rate from the evaluated periods, and including evaluation of period positions of falling edges of known bits of the ID field.

8. The slave bus subscriber according to claim 7, characterized in that the slave bus subscriber evaluates at least the periods between the falling edges of the first bit of the sync break field, of five bits of the sync field and at least of the first bit of the ID field.

9. The slave bus subscriber of claim 7, wherein the bit rate identifier identifies bit rates of data packets wherein the sync break field, the sync field and the ID field have one start bit each, the sync field and the ID field have one stop bit each, and the sync break field has at least one stop bit.

10. The slave bus subscriber of claim 9, wherein the bit rate identifier identifies bit rates of data packets as long as a number of stop bits of the sync break field is not a priori known to the slave bus subscriber, the number of stop bits can be indicated to the slave bus subscriber or programmed in it.

11. The slave bus subscriber of claim 9 wherein the bit rate identifier identifies bit rates of data packets wherein a number of the stop bits of the sync break field greater than one bit is taken into account when the periods are determined.

12. The slave bus subscriber of claim 8, wherein the bit rate identifier identifies bit rates of data packets when the serial data bus is a LIN data bus.

\* \* \* \* \*